(12) United States Patent
Kido et al.

(10) Patent No.: US 11,348,719 B2
(45) Date of Patent: May 31, 2022

(54) MULTILAYER INDUCTOR COMPONENT AND METHOD FOR MANUFACTURING MULTILAYER INDUCTOR COMPONENT

(71) Applicant: Murata Manufacturing Co., Ltd., Kyoto-fu (JP)

(72) Inventors: Tomohiro Kido, Nagaokakyo (JP);
Masahiro Kubota, Nagaokakyo (JP);
Tomonori Sakata, Nagaokakyo (JP);
Kenta Kondo, Nagaokakyo (JP);
Shimpei Tanabe, Nagaokakyo (JP);
Yoshiyuki Oota, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 783 days.

(21) Appl. No.: 16/205,045

(22) Filed: Nov. 29, 2018

(65) Prior Publication Data
US 2019/0189333 A1 Jun. 20, 2019

(30) Foreign Application Priority Data
Dec. 15, 2017 (JP) .............................. JP2017-240997

(51) Int. Cl.
*H01F 27/28* (2006.01)
*B32B 15/04* (2006.01)
(Continued)

(52) U.S. Cl.
CPC ......... *H01F 27/2804* (2013.01); *B32B 15/04* (2013.01); *B32B 15/20* (2013.01);
(Continued)

(58) Field of Classification Search
CPC .. H01F 27/2804; H01F 17/0013; B32B 15/04
See application file for complete search history.

(56) References Cited

U.S. PATENT DOCUMENTS

| 10,176,916 B2 | 1/2019 | Seko et al. |
| 2012/0007709 A1* | 1/2012 | Taniguchi ............ H01G 4/232 336/200 |

(Continued)

FOREIGN PATENT DOCUMENTS

| CN | 103219129 A | 7/2013 |
| CN | 107003605 A | 8/2017 |

(Continued)

OTHER PUBLICATIONS

An Office Action; "Notification of Reasons for Refusal," issued by the Japanese Patent Office dated Feb. 4, 2020, which corresponds to Japanese Patent Application No. 2017-240997 and is related to U.S. Appl. No. 16/205,045; with English language translation.

(Continued)

*Primary Examiner* — Elvin G Enad
*Assistant Examiner* — Malcolm Barnes
(74) *Attorney, Agent, or Firm* — Studebaker & Brackett PC (57) ABSTRACT

A multilayer inductor component includes an element body that is an insulator and a coil in which a plurality of coil conductor layers that extend along planes in the element body are electrically connected to each other. Also, each of the coil conductor layers includes metal part and glass part, and the glass part include internal glass portion that is entirely included in the metal part.

19 Claims, 8 Drawing Sheets

(51) Int. Cl.
    *H01F 17/00*         (2006.01)
    *H01F 27/29*         (2006.01)
    *H01F 41/04*         (2006.01)
    *B32B 15/20*         (2006.01)

(52) U.S. Cl.
    CPC ......... *H01F 17/0013* (2013.01); *H01F 27/29* (2013.01); *H01F 41/043* (2013.01); *B32B 2457/00* (2013.01); *H01F 2017/004* (2013.01); *H01F 2027/2809* (2013.01)

(56) References Cited

U.S. PATENT DOCUMENTS

| | | | | |
|---|---|---|---|---|
| 2013/0187744 | A1* | 7/2013 | Seko | H01F 17/0013 336/200 |
| 2013/0257576 | A1* | 10/2013 | Arata | H01F 17/0013 336/200 |
| 2015/0371728 | A1* | 12/2015 | Lee | H01B 1/24 336/200 |
| 2017/0236611 | A1* | 8/2017 | Kondo | C03C 3/076 252/508 |

FOREIGN PATENT DOCUMENTS

| | | | |
|---|---|---|---|
| JP | H07-082041 | A | 3/1995 |
| JP | 2005-005591 | A | 1/2005 |
| JP | 2013-153009 | A | 8/2013 |
| JP | 2013-183007 | A | 9/2013 |
| JP | 2014-045081 | A | 3/2014 |
| JP | 2014045081 | A * | 3/2014 |
| JP | 2014-182891 | A | 9/2014 |
| JP | 2016-009861 | A | 1/2016 |
| KR | 20150105786 | A * | 9/2015 |
| WO | 2016-076024 | A1 | 5/2016 |

OTHER PUBLICATIONS

An Office Action; "Notice of Reasons for Refusal," mailed by the Japanese Patent Office dated Aug. 11, 2020, which corresponds to Japanese Patent Application No. 2017-240997 and is related to U.S. Appl. No. 16/205,045 with English language translation.

An Office Action mailed by the China National Intellectual Property Administration dated Aug. 4, 2020, which corresponds to Chinese Patent Application No. 201811351471.1 and is related to U.S. Appl. No. 16/205,045 with English language translation.

* cited by examiner

MULTILAYER INDUCTOR COMPONENT AND METHOD FOR MANUFACTURING MULTILAYER INDUCTOR COMPONENT

CROSS-REFERENCE TO RELATED APPLICATION

This application claims benefit of priority to Japanese Patent Application No. 2017-240997, filed Dec. 15, 2017, the entire content of which is incorporated herein by reference.

BACKGROUND

Technical Field

The present disclosure relates to a multilayer inductor component formed by stacking insulator layers and coil conductor layers, and to a method for manufacturing a multilayer inductor component.

Background Art

In recent years, in accordance with increases in carrier frequencies of communication devices, e.g., cellular phones, many coiled inductors compatible with high frequencies in a GHz band have been used in signal sending blocks and signal receiving blocks of these devices. A multilayer inductor component has been in actual use as one type of such an inductor. The multilayer inductor component includes an element body that is an insulator and a plurality of coil conductor layers that extend along planes in the element body, and a coil is formed in the element body by electrically connecting the coil conductor layers to each other by using vias disposed in the element body. The coil conductor layer is formed by, for example, firing a conducting paste in which a metal is contained in a resin or performing sputtering, plating, or the like.

Regarding the above-described multilayer inductor component, it is necessary to ensure a high Q-factor (quality factor) in order to improve the performance of communication devices that operate at high frequency. For the purpose of increasing the Q-factor, it is required to reduce the resistance of a coil or to increase the efficiency of inductance that can be acquired with respect to the element body external shape (inductance acquisition efficiency).

A high-frequency current that passes through a coil conductor layer passes in the vicinity of the surface of the coil conductor layer because of a skin effect. Therefore, in order to reduce the resistance of the coil against a high-frequency current, it is effective to increase the surface area of the coil conductor layer.

Japanese Unexamined Patent Application Publication No. 2014-45081 discloses a multilayer inductor component in which the resistance of a coil is reduced by increasing the surface area of a coil conductor layer due to porosities that are formed in a conductive paste by a metal sintering around a resin before the resin is scattered because of gasification during firing.

SUMMARY

Figure 11A:
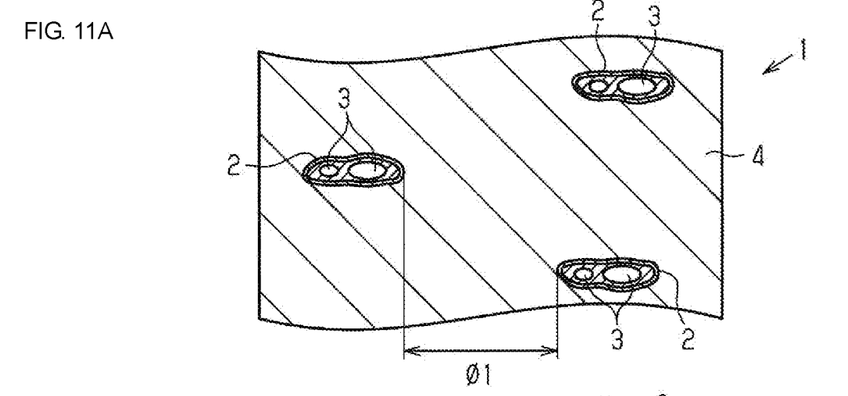
FIGS. 11A and 11B are sectional views showing multilayer coil components in the related art.
Figure 11B:
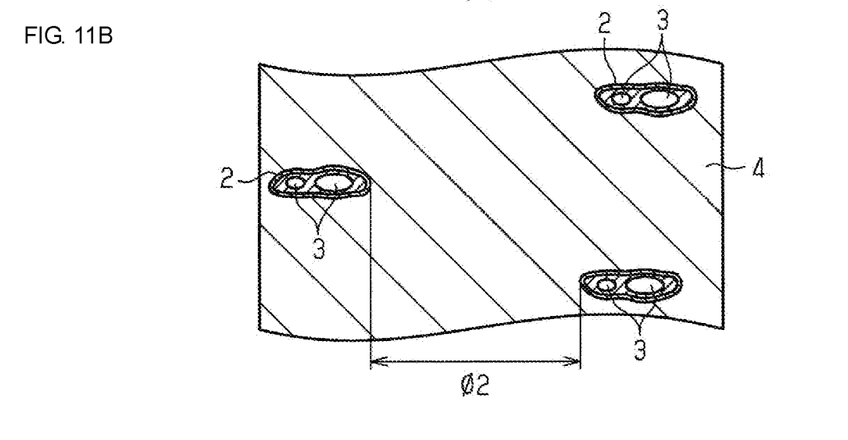

FIGS. 11A and 11B show the multilayer inductor component disclosed in Japanese Unexamined Patent Application Publication No. 2014-45081. Regarding the inductor component 1, the resistance of a coil is reduced by increasing the surface area of a coil conductor layer 2 due to porosities that are formed in the coil conductor layer 2 (coil conductor).

Meanwhile, the gasification temperature of a resin in a conductive paste is usually lower than the sintering completion temperature of a metal powder that is a primary component of the conductive paste and, therefore, porosities 3 formed after firing are not readily included entirely in a metal part of the coil conductor layer 2.

The material, for example, a glass powder, for forming the element body 4 covering the coil conductor layer 2 is sintered faster than the metal powder. Therefore, gas generated in the conductive paste is not readily scattered outside the element body 4 and is readily retained in the vicinity of the peripheral edge of the coil conductor layer 2, and porosities 3 are readily formed in that region.

In the thus formed multilayer inductor component 1 in practice, the peripheral edge of the coil conductor layer 2 do not have a smooth shape shown in FIG. 11A or FIG. 11B but has significant unevenness due to porosities 3 generated in the vicinity of the peripheral edge. In the coil conductor layer 2 having such a shape, smooth flow of a current is hindered, loss due to, for example, generation of an eddy current caused by local concentration of a current or disturbance in the direction of magnetic flux increase, and the inductance acquisition efficiency is reduced. Porosities 3 formed in the vicinity of the peripheral edge of the coil conductor layer 2 reduce the strength of the coil conductor layer 2 and may become a cause of an occurrence of breakage or an increase in resistance of the coil. That is, if the resistance of the coil is reduced by using the porosities 3 in the coil conductor layer 2, as disclosed in Japanese Unexamined Patent Application Publication No. 2014-45081, various problems may occur.

The present disclosure was realized in consideration of the above-described circumstances. Accordingly, the present disclosure provides a multilayer inductor component in which the resistance of a coil can be reduced without using porosities.

According to one embodiment of the present disclosure, a multilayer inductor component includes an element body that is an insulator and a coil in which a plurality of coil conductor layers that extend along planes in the element body are electrically connected to each other. Also, each of the coil conductor layers includes a metal part and a glass part, and the glass part include an internal glass portion that is entirely included in the metal part.

In this configuration, the surface area of the coil conductor layer is increased by the internal glass portion. In the above-described multilayer inductor component, preferably, the glass part include an exposed glass portion that is exposed from the metal part, and the coil conductor layer has a cross section orthogonal to an extension direction of the coil conductor layer in which the proportion of a total area of the internal glass portion to an area of the glass part is less than about 50%.

In this configuration, the surface area of the coil conductor layer is also increased by the exposed glass portion. In the above-described multilayer inductor component, preferably, the coil conductor layer has a cross section orthogonal to an extension direction of the coil conductor layer in which the proportion of a total area of the internal glass portion to an area of the glass part is about 50% or more.

In this configuration, the surface area of the coil conductor layer is increased and, in addition, smoothing of the peripheral edges of the metal part in the coil conductor layer is facilitated. In the above-described multilayer inductor component, preferably, to coil conductor layer has a cross section orthogonal to the extension direction in which the proportion of a total area of the internal glass portion to an area of the glass part is 100%.

In this configuration, smoothing of the peripheral edges of the metal part in the coil conductor layer is further facilitated. In the above-described multilayer inductor component, preferably, the coil conductor layer has a cross section orthogonal to the extension direction in which the proportion of a total area of the internal glass portion to an area of the coil conductor layer is about 1.0% or more and 20.0% or less (i.e., from about 1.0% to about 20.0%).

In this configuration, a smooth flow of current in the coil conductor layer is facilitated and, in addition, the surface area of the coil conductor layer can be increased. In the above-described multilayer inductor component, preferably, the element body includes glass, and when a glass portion in the element body within about 10 μm from the perimeter of the coil conductor layer is denoted as a peripheral glass portion and a glass portion in the element body outside the peripheral glass portion is denoted as an outlying glass portion, the softening temperature of the peripheral glass portion is lower than the softening temperature of the outlying glass portion.

In this configuration, the coil conductor layer is formed in the state of being surrounded by the peripheral glass portion that is relatively readily softened and, therefore, smoothing of the peripheral edge of the coil conductor layer is facilitated. In the above-described multilayer inductor component, preferably, the softening temperature of the peripheral glass portion is lower than or equal to the softening temperature of the internal glass portion.

In this configuration, the coil conductor layer is formed in the state of being surrounded by the peripheral glass portion that is relatively readily softened and, therefore, smoothing of the peripheral edge of the coil conductor layer is facilitated. In the above-described multilayer inductor component, preferably, the element body includes glass, and when a glass portion in the element body within about 10 μm from the perimeter of the coil conductor layer is denoted as a peripheral glass portion and a glass portion in the element body outside the peripheral glass portion is denoted as an outlying glass portion, the peripheral glass portion contains at least one type of filler element that is any one of Bi, Li, Na, K, Mg, Ca, Sr, Ba, Co, Zn, B, Pb, Al, Zr, P, and V, and the peripheral glass portion has a higher filler element concentration than the outlying glass portion.

In this configuration, the coil conductor layer is formed in the state of being surrounded by the peripheral glass portion that is relatively readily softened and, therefore, smoothing of the peripheral edge of the coil conductor layer is facilitated. In the above-described multilayer inductor component, preferably, the Si concentration in the peripheral glass portion is lower than the Si concentration in the outlying glass portion.

In this configuration, the coil conductor layer is formed in the state of being surrounded by the peripheral glass portion that is relatively readily softened and, therefore, smoothing of the peripheral edge of the coil conductor layer is facilitated. In the above-described multilayer inductor component, preferably, when a glass portion located at an outermost position in a direction orthogonal to the plane along which the coil conductor layer in the element body extends is denoted as an outer layer glass portion, the Si concentration in the peripheral glass portion is lower than the Si concentration in the outer layer glass portion.

In this configuration, the clarity of the portion located at an outermost position in the element body is improved, the visibility of an alignment mark is improved, and precision in division into pieces is improved. In the above-described multilayer inductor component, preferably, when a glass portion located at an outermost position in a direction orthogonal to the plane along which the coil conductor layer in the element body extends is denoted as an outer layer glass portion, the Si concentration in the peripheral glass portion is higher than the Si concentration in the outer layer glass portion.

In this configuration, the strength of the element body is enhanced. In the above-described multilayer inductor component, preferably, the metal part has a plurality of crystallites, and the average grain size of the plurality of crystallites is about 0.5 μm or more and 15.0 μm or less (i.e., from about 0.5 μm to 15.0 μm).

In this configuration, grain boundaries that suppress the flow of electrons are decreased. Therefore, the resistance of the coil conductor layer can be reduced, excessive growth of crystallites is suppressed, and smoothing of the peripheral edge of the coil conductor layer is facilitated.

In the above-described multilayer inductor component, preferably, the element body is a sintered body. In this configuration, the strength of the element body is enhanced.

In the above-described multilayer inductor component, preferably, a first outer electrode and a second outer electrode that are disposed along an outer surface of the element body and that are electrically connected to a first end and a second end of the coil, respectively, are further included. The outer surface includes a mounting surface on which both the first outer electrode and the second outer electrode are disposed, a first end surface on which only the first outer electrode is disposed, and a second end surface on which only the second outer electrode is disposed. Also, the mounting surface, the first end surface, and the second end surface are orthogonal to the planes along which the coil conductor layers extend.

In this configuration, the fixing force during mounting on a substrate is increased and, in addition, reduction in Q-factor due to eddy current loss is suppressed. According to another embodiment of the present disclosure, a multilayer inductor component includes an element body that is an insulator and a coil in which a plurality of coil conductor layers that extend along planes in the element body are electrically connected to each other. Each of the coil conductor layers includes a metal part and a glass part. The element body includes glass, and when a glass portion in the element body within about 10 μm from the perimeter of the coil conductor layer is denoted as a peripheral glass portion and a glass portion in the element body outside the peripheral glass portion is denoted as an outlying glass portion, the softening temperature of the peripheral glass portion is lower than the softening temperature of the outlying glass portion.

In this configuration, the coil conductor layer is formed in the state of being surrounded by the peripheral glass portion that is relatively readily softened and, therefore, smoothing of the peripheral edge of the coil conductor layer is facilitated. In the above-described multilayer inductor component, preferably, the softening temperature of the peripheral glass portion is lower than or equal to the softening temperature of the glass part.

In this configuration, the coil conductor layer is formed in the state of being surrounded by the peripheral glass portion that is relatively readily softened and, therefore, smoothing of the peripheral edge of the coil conductor layer is facilitated. According to another embodiment of the present disclosure, a method for manufacturing a multilayer inductor component includes the steps of forming a multilayer body by using an insulating paste containing a glass powder and an conductive paste containing a metal powder and a glass powder such that coil conductor patterns composed of the conductive paste are arranged between a plurality of insulating paste layers composed of the insulating paste in the multilayer body and firing the multilayer body so as to sinter the metal powder and the glass powder into a metal part and a glass part, respectively. In the forming a multilayer body, the glass powder contained in the conductive paste has a lower softening temperature than the glass powder contained in the insulating paste. In the firing of the multilayer body, the glass powder contained in the conductive paste forms an internal glass portion by entirely included into the metal part and sintered, and the glass powder contained in the conductive paste forms a peripheral glass portion by pushed outside the metal part and sintered.

In this method, regarding coil conductor layer formed by sintering the coil conductor pattern, the surface area is increased and smoothing of the peripheral edge is facilitated due to the internal glass portion and the peripheral glass portion formed in the firing of the multilayer body.

In the multilayer inductor component according to some embodiments of the present disclosure, the resistance of a coil can be reduced without using porosities.

Other features, elements, characteristics and advantages of the present disclosure will become more apparent from the following detailed description with reference to the attached drawings.

DETAILED DESCRIPTION

The embodiment according to an aspect of the present disclosure will be described below with reference to the drawings. A multilayer inductor component 10 shown in FIG. 1 includes an element body 11 that is an insulator, a coil 12 disposed in the element body 11, and a first outer electrode 13x and a second outer electrode 13y that are disposed along the outer surfaces of the element body 11 and that are electrically connected to a first end and a second end, respectively, of the coil 12.

The element body 11 is formed by stacking a plurality of insulating layers, and the coil 12 is formed by electrically connecting a plurality of coil conductor layers that extend along planes corresponding to the principal surfaces of the insulating layers in the element body 11 to each other by using vias 14. The outer surfaces of the element body 11 include a mounting surface 11a on which both the first outer electrode 13x and the second outer electrode 13y are disposed, a first end surface 11b on which only the first outer electrode 13x is disposed, and a second end surface 11c on which only the second outer electrode 13y is disposed, and the mounting surface 11a, the first end surface 11b, and the second end surface 11c are orthogonal to the principal surface of the insulating layer. That is, in the multilayer inductor component 10 shown in FIG. 1, the mounting surface 11a, the stacking direction of the insulating layers, and the winding axis of the coil 12 are parallel to each other.

Figure 1:
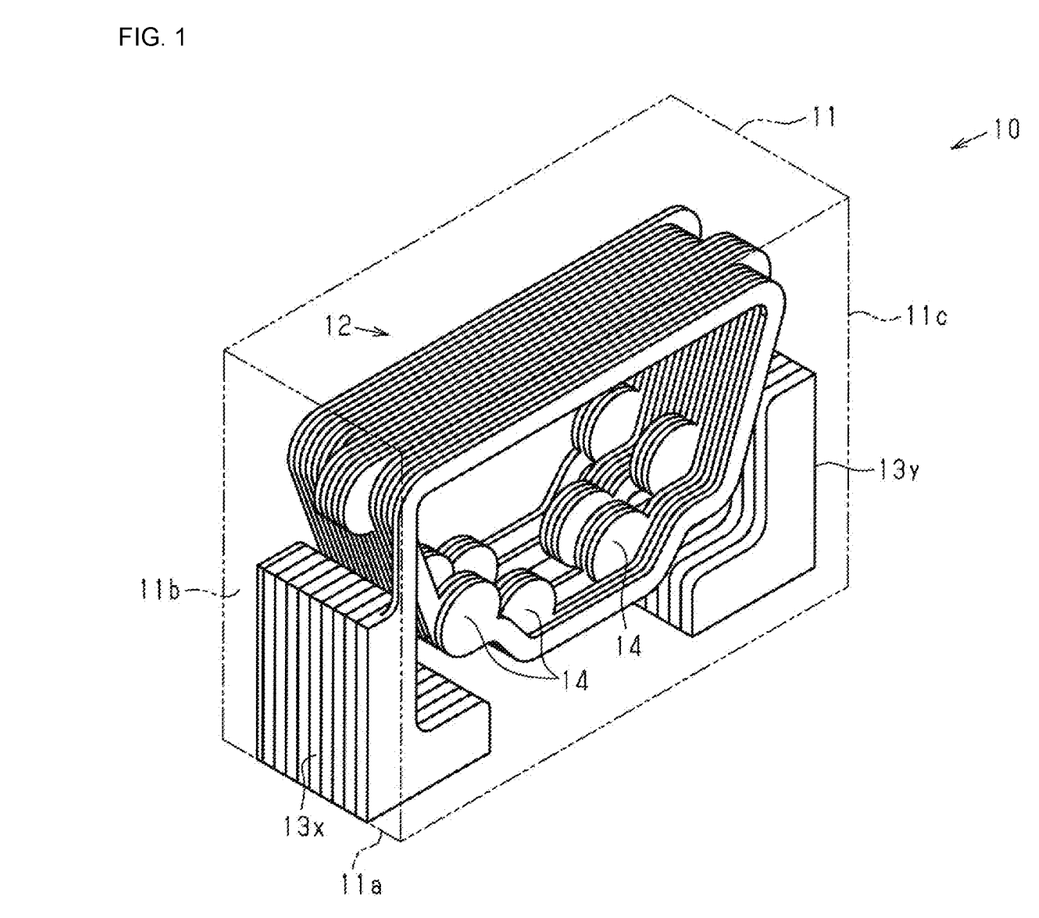
FIG. 1 is a perspective view showing a multilayer inductor component.
Figure 2:
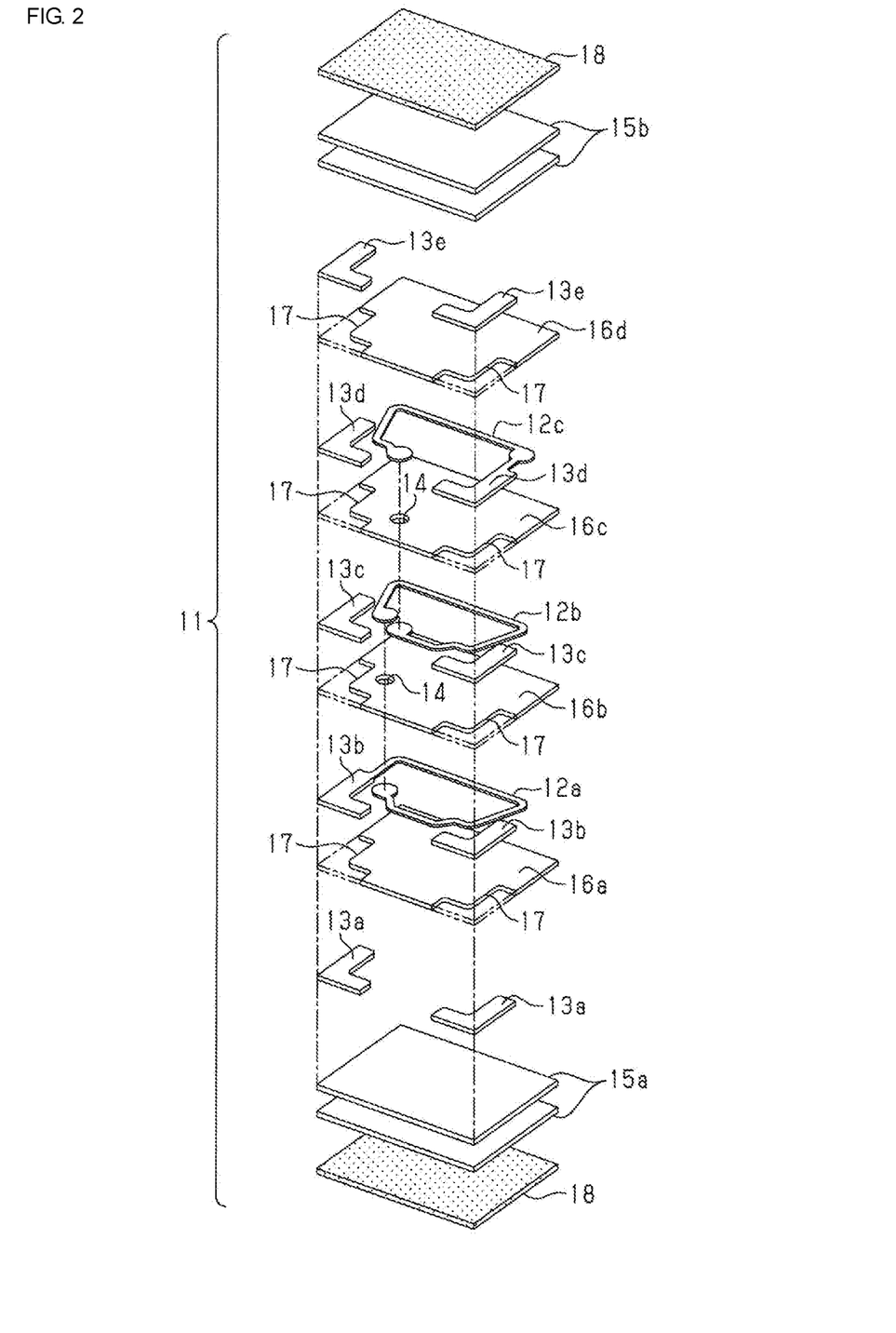
FIG. 2 is an exploded perspective view showing an outline of each portion of a multilayer inductor component.

FIG. 2 shows an outline of each portion of a multilayer inductor component 10. Insulating layers 15a, 15b, 16a to 16c, and 18 constituting the element body 11, coil conductor layers 12a to 12c constituting the coil 12, and outer electrode layers 13a to 13e constituting the first outer electrode 13x and the second outer electrode 13y are stacked sequentially, for example, from the bottom toward the top in FIG. 2. In FIG. 1, stacking is performed, for example, from the front surface toward the back surface of the element body 11. In this regard, the stacking direction may be the direction opposite to the direction shown in FIG. 1 or FIG. 2.

An example of a method for manufacturing the multilayer inductor component 10 will be described below with reference to FIG. 2. Initially, an insulating paste containing a glass powder is repeatedly applied to a substrate, although not shown in the drawing, by screen printing so as to form a marker insulating paste layer 18 and outer layer insulating paste layers 15a in this order. Subsequently, a photosensitive conductive paste containing a metal powder and a glass powder is applied to the outer layer insulating paste layer 15a and patterning is performed by photolithography so as to form a pair of outer electrode patterns 13a.

One outer electrode pattern 13a is formed into the shape of a letter L from the position corresponding to the mounting surface 11a to the position corresponding to the first end surface 11b of the outer layer insulating paste layer 15a, and the other outer electrode pattern 13a is formed into the shape of a letter L from the position corresponding to the mounting surface 11a to the position corresponding to the second end surface 11c of the outer layer insulating paste layer 15a. A photosensitive insulating paste containing a glass powder is applied to the outer layer insulating paste layer 15a provided with the outer electrode patterns 13a, and patterning is performed by photolithography so as to form an insulating paste layer 16a provided with cavities 17 on the outer electrode patterns 13a.

The above-described conductive paste is applied to the insulating paste layer 16a and the cavities 17, and patterning is performed by photolithography so as to form a pair of outer electrode patterns 13b and a coil conductor pattern 12a that extends and makes about one round on the principal surface of the insulating paste layer 16a. The coil conductor pattern 12a is integrally formed with one of the outer electrode patterns 13b so as to be electrically connected to each other. Each of the outer electrode patterns 13b is stacked on and electrically connected to the outer electrode pattern 13a through the cavity 17.

The above-described photosensitive insulating paste is applied to the insulating paste layer 16a provided with the outer electrode pattern 13b and the coil conductor pattern 12a, and patterning is performed by photolithography so as to form an insulating paste layer 16b provided with a via 14 and the same cavity 17 as that in the insulating paste layer 16a. The via 14 is formed on the end portion that is not connected to the outer electrode pattern 13b of the coil conductor pattern 12a.

The above-described conductive paste is applied to the insulating paste layer 16b, the cavities 17, and the via 14, and patterning is performed by photolithography so as to form a pair of outer electrode patterns 13c and a coil conductor pattern 12b that extends and makes about one round on the principal surface of the insulating paste layer 16b. One end portion of the coil conductor pattern 12b is electrically connected to the coil conductor pattern 12a that is a layer under the coil conductor pattern 12b through the conductive paste applied into the via 14. Each of the outer electrode patterns 13c is stacked on and electrically connected to the outer electrode pattern 13b through the cavity 17.

The same steps as those described above are appropriately combined and repeated and, thereby, a plurality of insulating paste layers 16a to 16d and coil conductor patterns 12a to 12c connected to each other through the cavities 17 are stacked. The coil conductor pattern 12c serving as the uppermost layer is integrally formed with one of the outer electrode patterns 13d at the end portion opposite to the via 14 so as to be electrically connected to each other.

The insulating paste is applied to the insulating paste layer 16d provided with the outer electrode patterns 13e so as to form the outer layer insulating paste layers 15b and the marker insulating paste layer 18 in this order. Consequently, a multilayer body is formed.

A plurality of multilayer inductor components 10 shown in FIG. 2 may be simultaneously formed. In this case, a mother multilayer body in which a plurality of outer electrode patterns 13a to 13e and coil conductor patterns 12a to 12c are arranged in a matrix may be formed, and the mother multilayer body may be cut into the individual multilayer bodies by dicing. At this time, as shown in FIG. 1, the outer electrode patterns 13a to 13e are exposed at the surfaces corresponding to the mounting surface 11a, the first end surface 11b, and the second end surface 11c of the multilayer body. In this case, the outer electrode patterns 13a to 13e and the cavities 17 may be formed into the shape of a letter T or a cross instead of the shape of a letter L and formed into the shape of a letter L by dicing.

Subsequently, the multilayer body is fired under a predetermined condition and, thereby, the insulating paste layers, coil conductor patterns, and the outer electrode patterns are sintered so as to form the insulator layers, the coil conductor layers, and outer electrode layers. Then, barrel finishing is performed so as to form the element body 11, the coil 12, and the outer electrodes 13x and 13y shown in FIG. 1. Thereafter, the outer electrodes 13x and 13y are subjected to Ni plating and Sn plating having a thickness of about 2 μm to 10 μm in this order so as to complete the multilayer inductor component 10.

In the above description, the insulating paste serving as a material for forming the outer layer insulating paste layers 15a and 15b, the insulating paste layers 16a to 16d, and the marker insulating paste layer 18 is, for example, a glass paste in which a glass powder is included in a varnish. In this regard, the insulating paste serving as a material for forming the outer layer insulating paste layers 15a and 15b and the marker insulating paste layer 18 may be either photosensitive or non-photosensitive. The insulating paste serving as a material for forming the marker insulating paste layer 18 may contain a pigment, and the surfaces of the multilayer inductor component 10 can be thereby distinguished.

The photosensitive conductive paste for forming the coil conductor patterns 12a to 12c and outer electrode patterns 13a to 13e is, for example, a paste in which a metal powder of Ag, Cu, Au, or the like and a glass powder are included in a varnish. The glass powder included in the insulating paste or the conductive paste may contain Bi, Li, Na, K, Mg, Ca, Sr, Ba, Co, Zn, B, Pb, Al, Zr, P, V, and the like.

Next, the configuration of the coil conductor layers 12a to 12c in which the conductive paste containing the above-described metal powder and glass powder is sintered in the firing step will be described. FIGS. 3A to 3D show the configuration of the coil conductor layers 12a to 12c that is sintered at a sintering temperature of t1, t2, or t3 for a firing time of T1 or T2 with reference to a section (cross section) orthogonal to the extension direction of the coil conductor layers 12a to 12c.

Figure 3A:
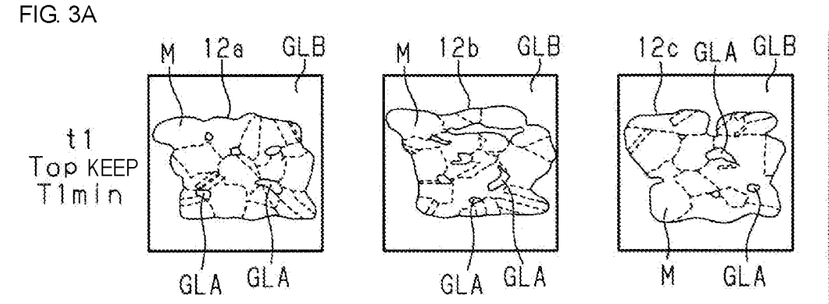
FIGS. 3A to 3D are explanatory diagrams showing a firing process of a coil conductor.
Figure 3B:
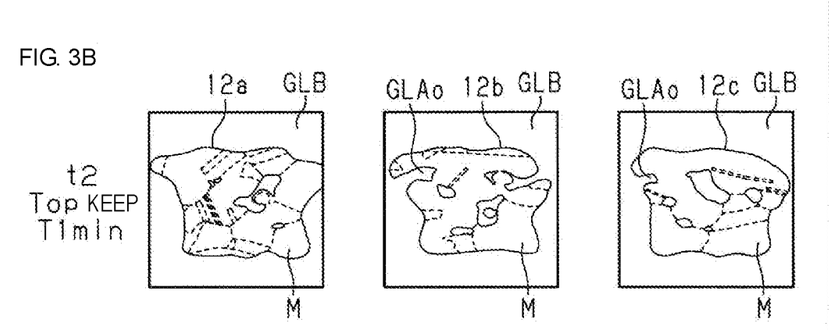
Figure 3C:
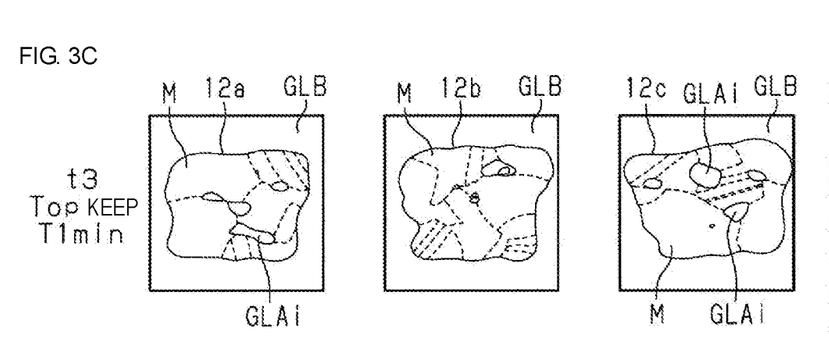
Figure 3D:
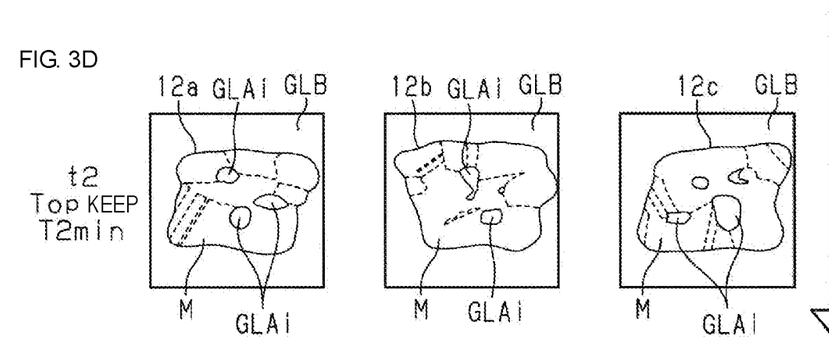
Figure 4A:
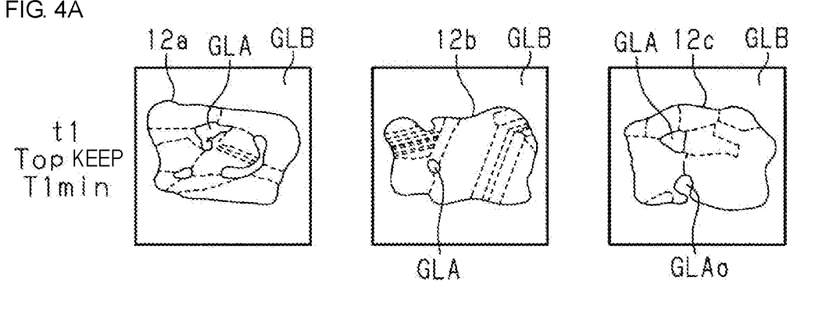
FIGS. 4A to 4D are explanatory diagrams showing a firing process of a coil conductor.
Figure 4B:
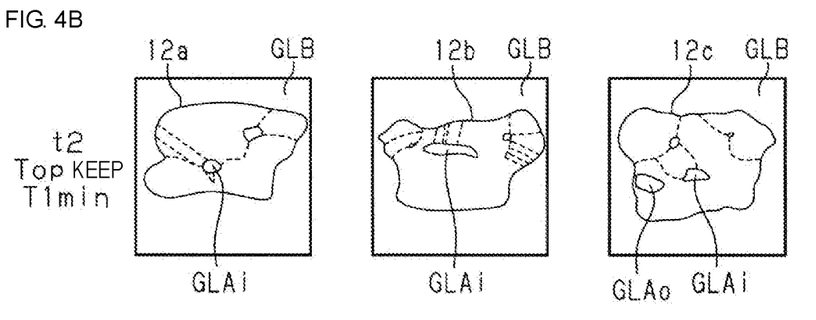
Figure 4C:
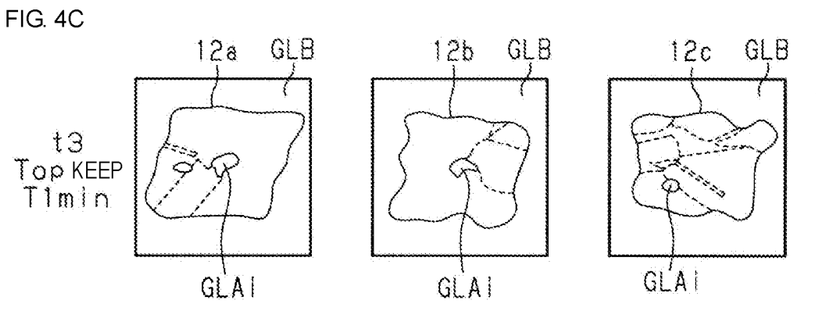
Figure 4D:
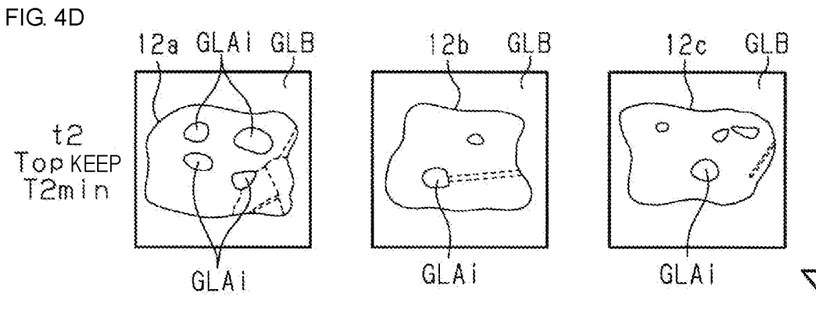

Regarding the firing temperatures t1 to t3, $t1<t2<t3$ applies, and regarding the firing times T1 and T2, $T1<T2$ applies. That is, when the firing step is finished, the degree of advance in sintering of the coil conductor layers 12a to 12c with respect to FIG. 3B is higher than the degree with respect to FIG. 3A, the degree with respect to FIG. 3C is higher than the degree with respect to FIG. 3B, and the degree with respect to FIG. 3D is higher than the degree with respect to FIG. 3B.

As shown in FIGS. 3A to 3D, each of the coil conductor layers 12a to 12c includes a metal part M in which a metal powder contained in the conductive paste is sintered and a glass part GLA in which a glass powder is sintered. The glass part GLA include internal glass portions GLAi each entirely included in the metal part M and exposed glass portions GLAo exposed from and partially included in the metal part M.

The element body 11 includes a peripheral glass portion GLB as a glass portion in the element body 11 within 10 μm from the perimeter of each of the coil conductor layers 12a to 12c. As is clear from FIG. 3A and FIG. 3B in which sintering does not much advance, the glass part GLA includes not only the internal glass portions GLAi but also the exposed glass portions GLAo. On the other hand, as is clear from FIG. 3C and FIG. 3D in which sintering advances, the glass part GLA do not include the exposed glass portions GLAo but include only the internal glass portions GLAi. Also, it is shown that the peripheral edges of the metal part M become smoother in proportion to the degree of advance in sintering.

Figure 5A:
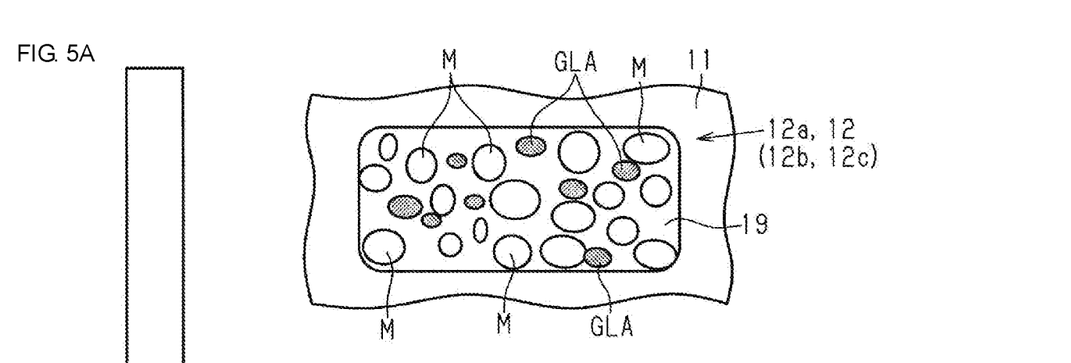
FIGS. 5A to 5D are explanatory diagrams showing a firing process of a coil conductor.

The sintering process of the coil conductor layers 12a to 12c will be described in detail with reference to the schematic diagram shown in FIGS. 5A to 5D. As shown in FIG. 5A, the coil conductor patterns 12a to 12c before firing are photo-cured photosensitive conductive pastes and are in the state in which the metal powder M and the glass powder GLA are dispersed in a varnish 19 serving as a binder.

Figure 5B:
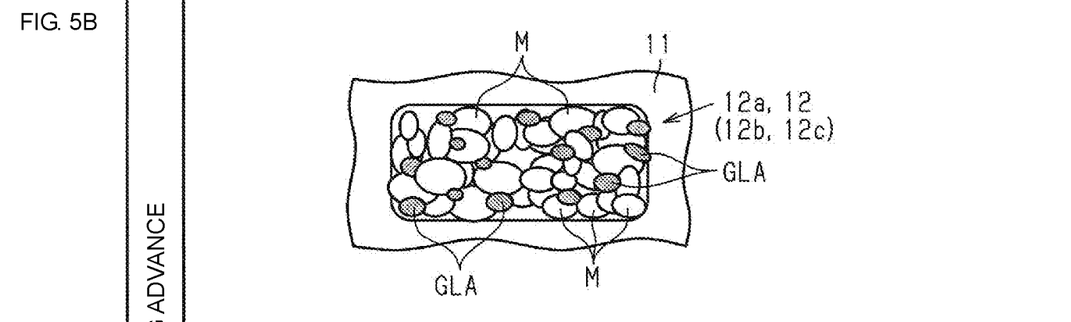

When sintering is started in this state, as shown in FIG. 5B, burning and scattering of the varnish 19 advance, the metal powder M is sintered so as to become the metal part M and, in addition, necking occurs so as to increase the interfaces between adjacent metal part M. At this time, the glass powder GLA is also sintered so as to become the glass part GLA. However, some glass part GLA having relatively low softening temperatures are softened and begin to flow along the interfaces between metal part M.

Figure 5C:
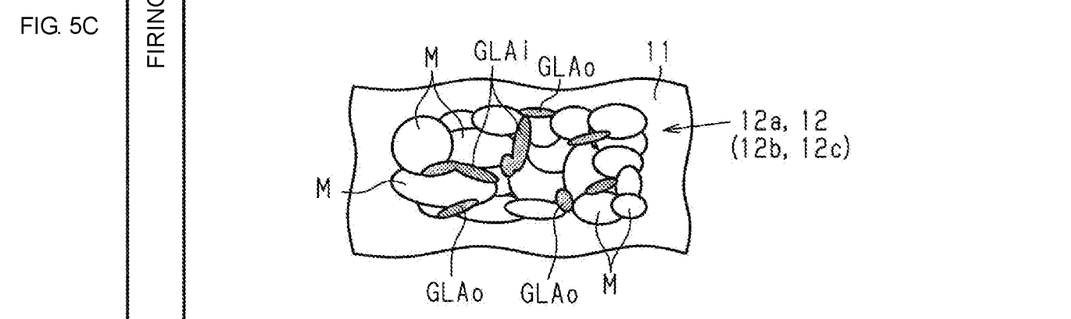

Subsequently, as shown in FIG. 5C, sintering of metal part M is further facilitated because softened glass part GLA flow along the interfaces between metal part M, and grain sizes of metal part M increase. At this time, internal glass portions GLAi that are entirely included in the metal part M and sintered because the softening temperature is relatively high and the amount of flow is small and exposed glass portions GLAo that flows and sinters at peripheral edges of the metal part M because the softening temperature is relatively low. Some glass part GLA that are softened and flow in advance of the exposed glass portions GLAo are pushed outside the metal part M and sintered so as to form the peripheral glass portions GLB of the element body 11. Therefore, at this stage, the coil conductor layers 12a to 12c that include the metal part M and the glass part GLA shown in FIG. 3A and FIG. 3B, the glass part GLA including the internal glass portions GLAi and the exposed glass portions GLAo, are formed. At this time, the coil conductor layers 12a to 12c are formed in the state of being partly surrounded by the peripheral glass portion GLB that is softened in advance. Consequently, smoothing of the peripheral edges composed of the metal part M and the exposed glass portions GLAo of the coil conductor layers 12a to 12c is facilitated.

Figure 5D:
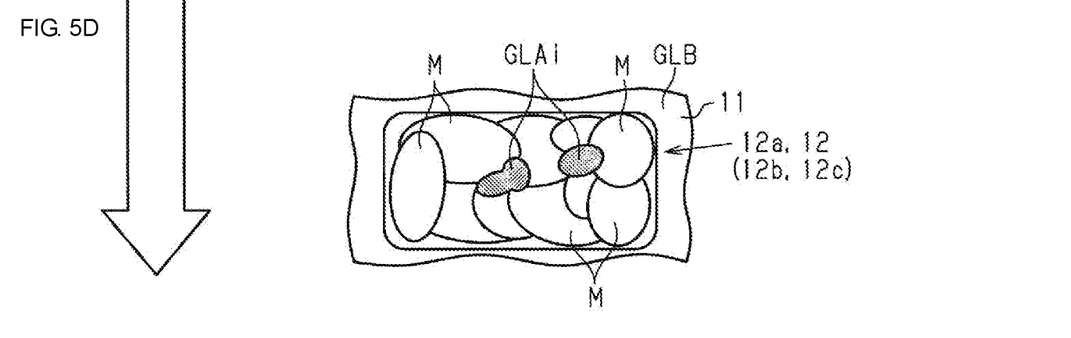

As shown in FIG. 5D, when firing further advances, the grain sizes of the metal part M further increases, and the exposed glass portions GLAo is pushed outside the metal part M so as to become the peripheral glass portion GLB. Consequently, at this stage, the coil conductor layers 12a to 12c that include the metal part M and the glass part GLA, the glass part GLA including only the internal glass portions GLAi, shown in FIG. 3C and FIG. 3D are formed. At this time, the coil conductor layers 12a to 12c are formed in the state in which the exposed glass portions GLAo are pushed outside the metal part M and, therefore, the peripheral edges of the metal part M in the coil conductor layers 12a to 12c are made smooth.

As described above, the proportion of the internal glass portions GLAi in the glass part GLA can be controlled by the amount of the exposed glass portions GLAo pushed out (converted to the peripheral glass portion GLB), that is, the degree of advance of sintering.

FIGS. 4A to 4D show the configuration of the coil conductor layers 12a to 12c that is sintered at a firing temperature of t1, t2, or t3 for a firing time of T1 or T2 when Bi is added to the glass powder in the conductive paste for forming the coil conductor layers 12a to 12c. When Bi is added, the temperature at which the glass part formed by sintering the glass powder are softened (softening temperature) is lower than the softening temperature of the glass part formed by sintering a glass powder not including Bi.

As is clear from the result of comparisons between FIGS. 4A to 4D and FIGS. 3A to 3D with respect to the same firing temperature and the same firing time, sintering of the coil conductor layers 12a to 12c in FIGS. 4A to 4D readily advances compared with the coil conductor layers 12a to 12c in FIGS. 3A to 3D, the proportion of the internal glass portions GLAi to the glass part GLA is larger, and smoothing of the peripheral edges of the coil conductor layers 12a to 12c is facilitated. As described above, the proportion of the internal glass portions GLAi in the glass part GLA can also be adjusted by addition or no addition of Bi to the glass powder. The degree of decrease in the softening temperature of the glass part formed by sintering the glass fiber containing Bi is substantially in proportion to the amount of Bi added. Therefore, the above-described proportion of the internal glass portions can also be adjusted by the amount of Bi added to the glass powder.

As is clear from the above description, the glass powder that is contained in the coil conductor layers 12a to 12c and that does not become the internal glass portions GLAi but becomes the exposed glass portions GLAo or the peripheral glass portion GLB has a relatively low softening temperature and high fluidity. Therefore, in the coil conductor layers 12a to 12c, the softening temperature of the exposed glass portions GLAo and the softening temperature of the peripheral glass portion GLB are lower than or equal to the softening temperature of the internal glass portions GLAi. The softening temperature of the peripheral glass portion GLB is lower than or equal to the softening temperature of the exposed glass portions GLAo. That is, regarding the softening temperature, the peripheral glass portion GLB≥the exposed glass portions GLAo≥the internal glass portions GLAi applies. When a glass portion in the element body 11 outside the peripheral glass portion in, for example, the central portion and the outer edge portion of the element body 11 is denoted as an outlying glass portion, it is preferable that the softening temperature of the peripheral glass portion GLB be lower than the softening temperature of the outlying glass portion. In this case, the coil conductor layers 12a to 12c are formed in the state of being surrounded by the peripheral glass portion GLB that is relatively readily softened. Therefore, smoothing of the peripheral edges of the coil conductor layers 12a to 12c is facilitated. In addition, the outlying glass portion that is relatively hard to soften is included and, thereby, strength and shape stability of the element body 11 are improved.

The filler element that is added to the glass powder for the purpose of decreasing the softening temperature of the glass part is not limited to Bi as long as the filler element is any one of Bi, Li, Na, K, Mg, Ca, Sr, Ba, Co, Zn, B, Pb, Al, Zr, P, and V. That is, preferably, the peripheral glass portion GLB contains at least one of the above-described filler elements. At this time, it is preferable that the peripheral glass portion GLB have a higher filler element concentration (total value of the concentrations of the above-described filler elements) than the outlying glass portion. When the glass powder included in the conductive paste for forming the coil conductor layers 12a to 12c contains at least one of the above-described filler elements, regarding the filler element concentration, the peripheral glass portion GLB≥the exposed glass portions GLAo≥the internal glass portions GLAi applies from the viewpoint of the softening temperature in the firing process.

Figure 6:
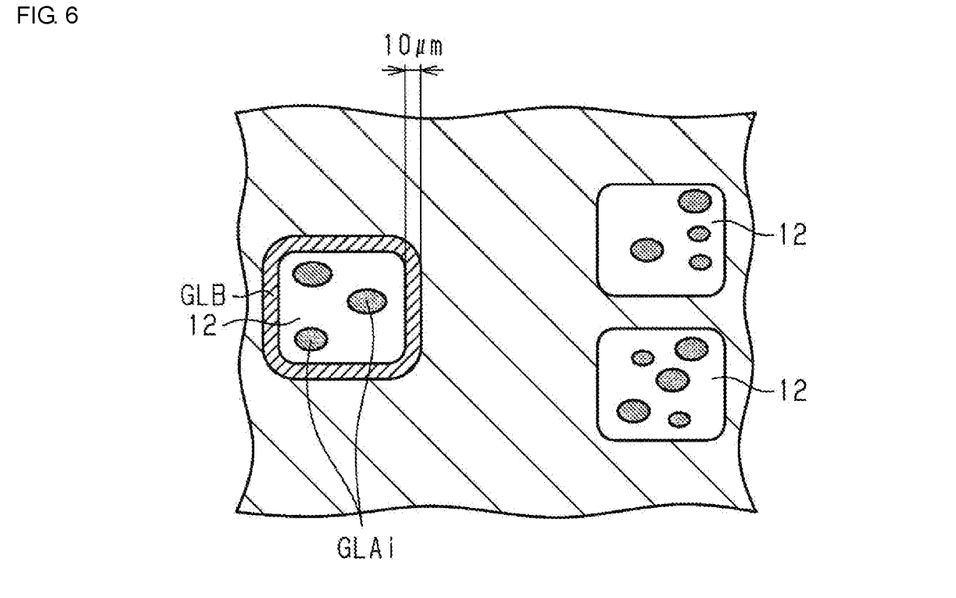
FIG. 6 is a schematic diagram showing a coil conductor in a firing step.

In this regard, as shown in FIG. 6, if the softening temperature is decreased in a region more than 10 μm away from the perimeters of the coil conductor layers 12a to 12c, that is, in the outlying glass portion, is decreased, short circuit may occur between adjacent coil conductor layers 12a to 12c because of excessive flowing of the metal part M. Therefore, it is preferable that the outlying glass portion do not contain the above-described filler element or the outlying glass have a lower filler element concentration than the peripheral glass portion GLB.

As the filler element concentration in the glass increases, the Si concentration in the glass decreases. Therefore, regarding the Si concentration, the peripheral glass portion GLB<the outlying glass portion applies. In the multilayer inductor component 10, the metal part M included in the coil conductor layers 12a to 12c form a plurality of crystallites, and the average grain size of the crystallites is preferably about 0.5 μm or more and 15.0 μm or less (from about 0.5 μm to 15.0 μm). When the above-described average grain size of the crystallites is about 0.5 μm or more, grain boundaries that suppress the flow of current are decreased and, therefore, the resistance of the coil 12 can be reduced. Meanwhile, when the above-described average grain size of the crystallites is about 15.0 µm or less, excessive growth of crystallites is suppressed, and smoothing of the peripheral edges of the coil conductor layers 12a to 12c is facilitated.

The average grain size of the crystallites is analyzed by orientation imaging microscopy (OIM) that is an image analyzer. When the measurement by OIM is difficult, analysis may be performed by adopting focused ion beam (FIB) and scanning ion microscopy (SIM).

Figure 7:
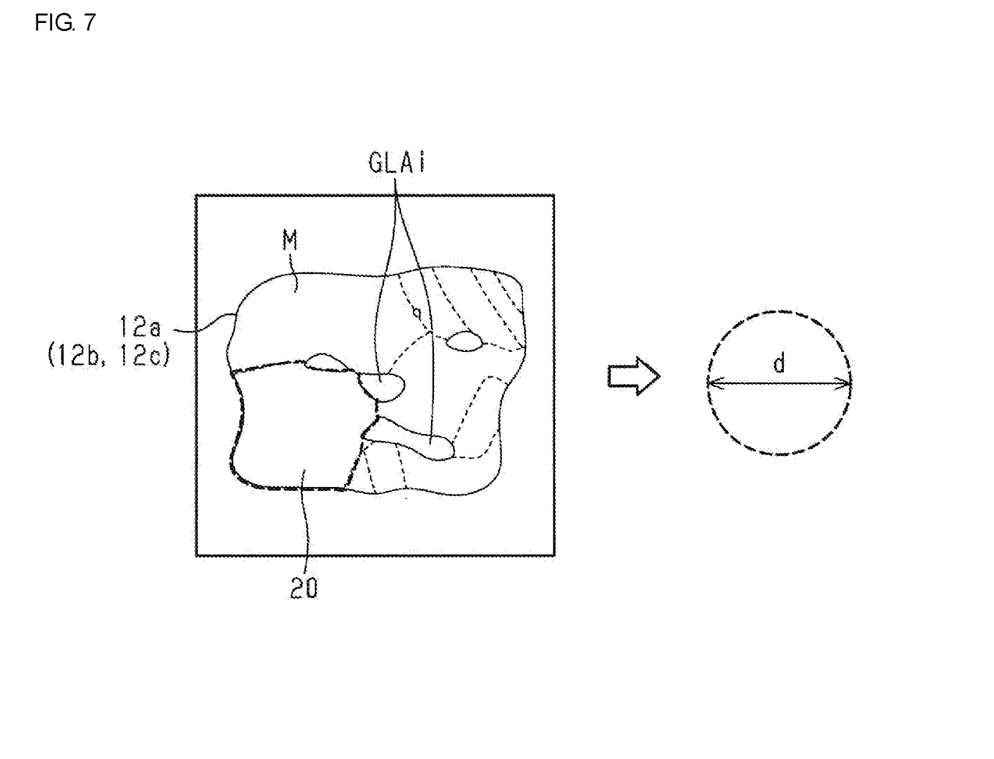
FIG. 7 is an explanatory diagram showing a method for calculating the diameter of a crystallite in a coil conductor.

In the latter case, as shown in FIG. 7, specifically, in a cross-sectional image of each of the coil conductor layers 12a to 12c, the area of a crystallite 20 of the metal portion M is calculated, the diameter d of a perfect circle having the same area as the area of the crystallite 20 is calculated and denoted as a grain size, and the average grain size is calculated. In the calculation of the average grain size, for example, five cross-sectional images of each of the coil conductor layers 12a to 12c may be taken from a cross section that passes the central portion of the element body 11, and an arithmetic average of the grain sizes of crystallites 20 in each image may be calculated.

Regarding the method for measuring the softening temperature, a portion including each glass may be cut as a sample from the element body 11 or the coil conductor layers 12a to 12c, and the molten state may be examined by a high-temperature microscope. Specifically, the sample is heated in a vacuum by using near-infrared rays or the like while being observed by the high-temperature microscope, the softening state of the sample is examined, and the temperature of start of softening is denoted as the softening temperature.

Figure 8:
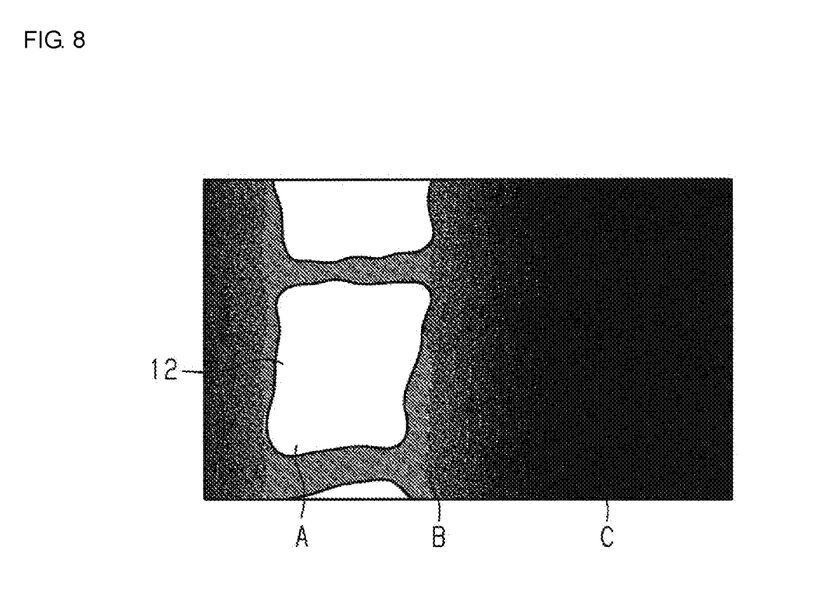
FIG. 8 is a schematic diagram showing a coil conductor in a firing step.

FIG. 8 is a diagram showing the state in which a firing step of an example of the multilayer inductor component 10 has been finished. In FIG. 8, the concentration of the filler element included in the glass is expressed by shading, a light portion excluding the coil conductor layer portion is a region in which the filler element concentration is high, and a dark portion is a region in which the filler element concentration is low. In the above-described example, an insulating paste including a glass powder and a conductive paste including a metal powder and a glass powder were used, and a multilayer body in which conductor patterns composed of the conductive paste were arranged between a plurality of insulating paste layers composed of the insulating paste was formed. In the above-described example, the above-described multilayer body was fired in the firing step, and the metal powder and the glass powder were sintered into the metal part and the glass part, respectively. Further, in the above-described example, a glass powder having a lower softening temperature than the glass powder included in the insulating paste was used as the glass powder included in the conductive paste.

As is clear from FIG. 8, in the step of firing the above-described multilayer body, each of internal glass portions GLAi in which the glass powder included in the above-described conductive paste was entirely included into the metal part and sintered (portion A in FIG. 8), a peripheral glass portion GLB in which the glass powder included in the above-described conductive paste was pushed outside the metal part and sintered (portion B in FIG. 8), and an outlying glass portion in which the glass powder included in the above-described insulating paste was sintered (portion C in FIG. 8) were formed. Regarding the filler element concentration, it was found that the peripheral glass portion GLB>the outlying glass portion.

Figure 9:
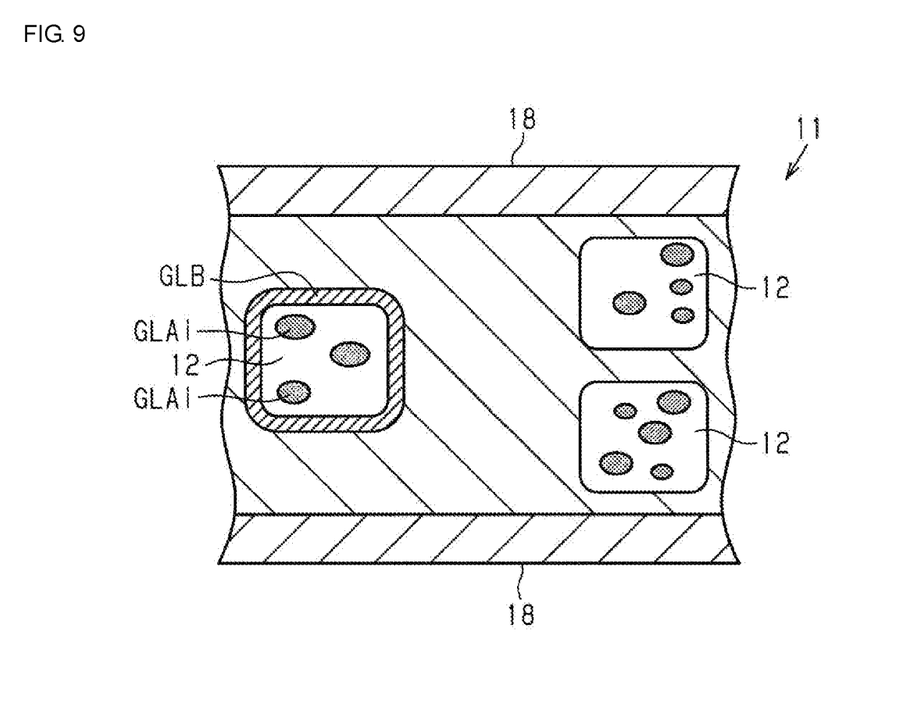
FIG. 9 is a schematic sectional view showing a multilayer body after firing.
Figure 10:
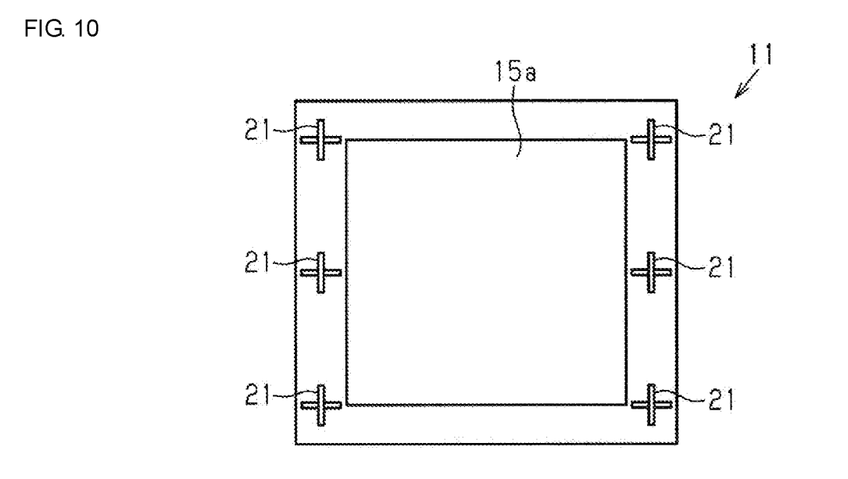
FIG. 10 is a schematic plan view showing a multilayer body after firing.

When a glass portion located at an outermost position in a direction orthogonal to the planes along which the coil conductor layers 12a to 12c in the element body 11 extend (in the vertical direction in FIG. 9) is denoted as an outer layer glass portion, the glass portion included in the insulator layers 18 (marker layers) serves as the outer layer glass portion in the multilayer inductor component 10. When the Si concentration in the peripheral glass portion is lower than the Si concentration in the outer layer glass portion, that is, when the filler element concentration in the outer glass portion is lower than the filler element concentration in the peripheral glass portion, the clarity of the insulator layer 18 located at the outermost position in the element body 11 is improved. At this time, as shown in FIG. 10, when alignment marks 21, which are used in division into pieces, are formed on the insulator layer 18 of a mother multilayer body, the clarity of the insulator layer 18 is improved, the visibility of the alignment marks 21 are improved, and precision in division into pieces is improved.

On the other hand, when the Si concentration in the peripheral glass portion is higher than the Si concentration in the outer layer glass portion, a filler that enhances the mechanical strength of the outer glass can be added so as to enhance the strength of the element body 11.

The multilayer inductor component having the above-described configuration can exert the following effects.

(1) Each of the coil conductor layers 12a to 12c includes the metal part M and the glass part GLA, and the glass part GLA include the internal glass portion GLAi entirely included in the metal part M. In this configuration, the surface areas of the coil conductor layers 12a to 12c increase due to the internal glass portion GLAi. That is, the resistance of the coil 12 can be reduced without using porosities, and the above-described various problems do not occur.

For example, in the multilayer inductor component 10, even when the inner diameters of the coil conductor layers 12a to 12c are increased for the purpose of improving the inductance acquisition efficiency and the peripheral edges of the coil conductor layers 12a to 12c come close to the peripheral edge of the element body 11, reduction in the strength of the element body 11 can be suppressed because the coil conductor layers 12a to 12c include no porosity.

(2) Preferably, the coil conductor layers 12a to 12c have a cross section orthogonal to the extension direction of each of the coil conductor layers 12a to 12c in which the proportion of a total area of the internal glass portions to an area of the glass part GLA is less than about 50%. In this configuration, the surface area of each of the coil conductor layers 12a to 12c is increased by the exposed glass portions GLAo and, therefore, the resistance of the coil 12 can further be reduced.

(3) Preferably, the coil conductor layers 12a to 12c have a cross section orthogonal to the extension direction of each of the coil conductor layers 12a to 12c in which the proportion of a total area of the internal glass portions to an area of the glass part GLA is about 50% or more. In this configuration, the surface areas of each of the coil conductor layers 12a to 12c is increased and, in addition, smoothing of the peripheral edges of the metal part M in each of the coil conductor layers 12a to 12c is facilitated. Therefore, generation of eddy current due to nonuniformity in the direction of generation of magnetic flux in the central portion of the coil 12 is suppressed, and loss at high frequency can be reduced. In addition, reduction in mechanical strength of the coil 12 can be suppressed.

(4) Preferably, the coil conductor layers 12a to 12c have a cross section orthogonal to the extension direction of each of the coil conductor layers 12a to 12c in which the proportion of a total area of the internal glass portions GLAi to an area of the glass part GLA is 100%. In this configuration, smoothing of the peripheral edges of the metal part M in each of the coil conductor layers 12a to 12c is further facilitated.

(5) Preferably, the coil conductor layers 12a to 12c have a cross section orthogonal to the extension direction of each of the coil conductor layers 12a to 12c in which the proportion of a total area of the internal glass portions GLAi to an area of any of the coil conductor layers 12a to 12c is about 1.0% or more and 20.0% or less (i.e., from about 1.0% to 20.0%). In this configuration, when the proportion of a total area of the internal glass portions GLAi is about 20.0% or less, a smooth flow of current in the coil conductor layers 12a to 12c is facilitated. Meanwhile, when the proportion of a total area of the internal glass portions GLAi is about 1.0% or more, the surface area of the coil conductor layers 12a to 12c can be increased. In this regard, it is preferable that the above-described area ratio be realized in a central cross section of the longest straight line portion of each of the coil conductor layers 12a to 12c, and it is preferable that the above-described area ratio be realized in a cross section of the coil conductor layer 12a or coil conductor layer 12c located at the outermost position. In these configurations, the above-described effects due to the area ratio are most markedly exerted.

(6) Preferably, the softening temperature of the peripheral glass portion GLB is lower than the softening temperature of the outlying glass portion. In this configuration, the coil conductor layers 12a to 12c are formed in the state of being surrounded by the peripheral glass portion GLB that is relatively readily softened and, therefore, smoothing of the peripheral edges of the coil conductor layers 12a to 12c is facilitated.

(7) Preferably, the softening temperature of the peripheral glass portion GLB is lower than or equal to the softening temperature of the internal glass portion GLAi. In this configuration, the coil conductor layers 12a to 12c are formed in the state of being surrounded by the peripheral glass portion GLB that is relatively readily softened and, therefore, smoothing of the peripheral edges of the coil conductor layers 12a to 12c is facilitated.

(8) Preferably, the peripheral glass portion GLB contains at least one type of filler element, and the peripheral glass GLB has a higher filler element concentration than the outlying glass portion. In this configuration, the coil conductor layers 12a to 12c are formed in the state of being surrounded by the peripheral glass portion GLB that is relatively readily softened and, therefore, smoothing of the peripheral edges of the coil conductor layers 12a to 12c is facilitated.

(9) Preferably, the Si concentration in the peripheral glass portion GLB is lower than the Si concentration in the outlying glass portion. In this configuration, the coil conductor layers 12a to 12c are formed in the state of being surrounded by the peripheral glass portion GLB that is relatively readily softened and, therefore, smoothing of the peripheral edges of the coil conductor layers 12a to 12c is facilitated.

(10) Preferably, the Si concentration in the peripheral glass portion GLB is lower than the Si concentration in the outer layer glass portion contained in the insulator layer 18 serving as the outermost layer. In this configuration, the clarity of the portion located at the outermost position in the element body 11 is improved, the visibility of alignment marks 21 is improved, and precision in division into pieces is improved.

(11) The Si concentration in the peripheral glass portion GLB may be higher than the Si concentration in the outer layer glass portion. In this configuration, the strength of the element body 11 is enhanced.

(12) Preferably, the average grain size of crystallites of the metal part M included in each of the coil conductor layers 12a to 12c is about 0.5 μm or more and 15.0 μm or less (i.e., from about 0.5 μm to 15.0 μm). In this configuration, grain boundaries that suppress the flow of electrons are decreased. Therefore, the resistance of the coil conductor layer can be reduced, excessive growth of crystallites is suppressed, and smoothing of the peripheral edges of the coil conductor layers 12a to 12c is facilitated.

(13) Preferably, the element body 11 is a sintered body. In this configuration, the strength of the element body 11 is enhanced.

(14) Preferably, the outer surface of the element body 11 includes a mounting surface 11a on which both the first outer electrode 13x and the second outer electrode 13y are disposed, a first end surface 11b on which only the first outer electrode 13x is disposed, and a second end surface 11c on which only the second outer electrode 13y is disposed. In this configuration, mounting solder forms fillets on the first end surface 11b and the second end surface 11c during mounting of the multilayer inductor component 10 on a substrate, and the fixing force of the multilayer inductor component 10 to the substrate can be increased. In this case, it is preferable that the mounting surface 11a, the first end surface 11b, and the second end surface 11c be orthogonal to the planes (principal surfaces of the insulating layers) on which the coil conductor layers 12a to 12c extend. In this configuration, magnetic fluxes generated in the coil 12 are not readily blocked by the first outer electrode 13x and the second outer electrode 13y, and reduction in Q-factor due to eddy current loss can be suppressed.

(15) Preferably, the softening temperature of the peripheral glass portion GLB is lower than or equal to the softening temperature of the glass part GLA (internal glass portion GLAi and exposed glass portion GLAo). In this configuration, the coil conductor layers 12a to 12c are formed in the state of being surrounded by the peripheral glass portion GLB that is relatively readily softened and, therefore, smoothing of the peripheral edges of the coil conductor layers 12a to 12c is facilitated.

(16) Preferably, the multilayer inductor component 10 is produced by adopting a manufacturing method including the steps of forming a multilayer body by using an insulating paste containing a glass powder and an conductive paste containing a metal powder and a glass powder such that the coil conductor patterns 12a to 12c composed of the conductive paste are arranged between a plurality of insulating paste layers composed of the insulating paste in the multilayer body and firing the multilayer body so as to sinter the metal powder and the glass powder into the metal part M and the glass part GLA, respectively, wherein in the forming a multilayer body, the glass powder contained in the conductive paste has a lower softening temperature than the glass powder contained in the insulating paste, and in the firing of the multilayer body, the glass powder contained in the conductive paste forms internal glass portions GLAi entirely included into the metal part M and sintered, and the glass powder contained in the conductive paste forms a peripheral glass portion GLB by pushed outside the metal part M and sintered. In this method, regarding the coil conductor layers 12a to 12c formed by sintering the coil conductor patterns 12a to 12c, the surface area is increased and smoothing of the peripheral edges is facilitated due to the internal glass portions GLAi and the peripheral glass portion GLB formed in the firing of the multilayer body.

The above-described embodiment may be modified as described below.

The metal part M in the coil conductor layers 12a to 12c may be composed of a good conductor, e.g., Cu or Au, other than Ag. The insulator layers 15a, 15b, 16a to 16c, and 18 may be configured to contain ferrite, resin, or the like instead of glass. That is, the element body 11 may be a sintered body other than the glass or be other than a sintered body. When the element body 11 is a sintered body, the strength of the element body 11 is enhanced. There is no particular limitation regarding the plating applied to the outer electrode, and a simple substance or an alloy of Sn, Ni, Ag, Cu, Pd, or Au or a multilayer configuration by combining a plurality of these may be adopted.

The insulator layer 16, and the cavities 17 and the vias 14 in the insulator layer 16 may be formed by a method other than photolithography, for example, pressure bonding of insulating material sheets, spin coating, or laser processing or drill processing after application of an insulating paste.

Preferably, each of the coil conductor layers 12a to 12c has a high aspect ratio t/w that is a ratio of the thickness t to the width w of a cross section. A high-frequency current mainly passes an inner side surface of a winding structure of each of the coil conductor layers 12a to 12c because of a skin effect. Therefore, when the thickness t is large, the electrical resistance against a high-frequency current can be reduced. In addition, when the width w is small, the inner diameter portion of the winding structure of each of the coil conductor layers 12a to 12c can be relatively increased and the inductance acquisition efficiency can be improved.

There is no particular limitation regarding the shape of the outer electrode, and a shape in which the outer electrode is formed on the first end surface, four surfaces adjacent to the first end surface, the second end surface, and four surfaces adjacent to the second end surface may be adopted or a shape in which the outer electrode is formed on only the mounting surface may be adopted.

There is no particular limitation regarding the relationship between the stacking direction and the mounting surface, and a configuration in which the stacking direction is orthogonal to the mounting surface may be adopted.

There is no particular limitation regarding the external shape size. The size may be, for example, 1005, 0804, 0603, 0402, or the like with reference to the dimension in the longitudinal direction and the dimension in the lateral direction of the mounting surface, or other ratios may be adopted. There is no particular limitation regarding the height dimension, and the dimension may be the same as the dimension in the longitudinal direction or dimension in the lateral direction, or the dimension may be different from these.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer inductor component comprising:
   an element body that is an insulator; and
   a coil in which a plurality of coil conductor layers that extend along planes in the element body are electrically connected to each other,
   wherein each of the coil conductor layers includes a metal part and a glass part,
   the glass part includes an internal glass portion that is entirely included in the metal part,
   the glass part includes an exposed glass portion that is exposed from the metal part, and
   at least one of the coil conductor layers has a cross section orthogonal to an extension direction of the coil conductor layer in which the proportion of a total area of the internal glass portion to an area of the glass part is less than 50%.

2. The multilayer inductor component according to claim 1, wherein
   at least one of the coil conductor layers has a cross section orthogonal to an extension direction of the coil conductor layer in which the proportion of a total area of the internal glass portion to an area of the glass part is 50% or more.

3. The multilayer inductor component according to claim 2, wherein
   at least one of the coil conductor layers has a cross section orthogonal to the extension direction in which the proportion of a total area of the internal glass portion to an area of the glass part is 100%.

4. The multilayer inductor component according to claim 2, wherein
   at least one of the coil conductor layers has a cross section orthogonal to the extension direction in which the proportion of a total area of the internal glass portion to an area of the coil conductor layer is from 1.0% to 20.0%.

5. The multilayer inductor component according to claim 1, wherein
   the element body includes glass, and
   when a glass portion in the element body within 10 μm from the perimeter of the coil conductor layer is denoted as a peripheral glass portion and a glass portion in the element body outside the peripheral glass portion is denoted as an outlying glass portion, the softening temperature of the peripheral glass portion is lower than the softening temperature of the outlying glass portion.

6. The multilayer inductor component according to claim 5, wherein
   the softening temperature of the peripheral glass portion is lower than or equal to the softening temperature of the internal glass portion.

7. The multilayer inductor component according to claim 1, wherein
   the element body includes glass, and
   when a glass portion in the element body within 10 μm from the perimeter of the coil conductor layer is denoted as a peripheral glass portion and a glass portion in the element body outside the peripheral glass portion is denoted as an outlying glass portion, the peripheral glass portion contains at least one type of filler element that is any one of Bi, Li, Na, K, Mg, Ca, Sr, Ba, Co, Zn, B, Pb, Al, Zr, P, and V, and the peripheral glass portion has a higher concentration of the filler element than the outlying glass portion.

8. The multilayer inductor component according to claim 7, wherein
   the Si concentration in the peripheral glass portion is lower than the Si concentration in the outlying glass portion.

9. The multilayer inductor component according to claim 7, wherein when a glass portion located at an outermost position in a direction orthogonal to the plane along which the coil conductor layer extends is denoted as an outer layer glass portion, and the Si concentration in the peripheral glass portion is lower than the Si concentration in the outer layer glass portion.

10. The multilayer inductor component according to claim 7, wherein when a glass portion located at an outermost position in a direction orthogonal to the plane along which the coil conductor layer extends is denoted as an outer layer glass portion, the Si concentration in the peripheral glass portion is higher than the Si concentration in the outer layer glass portion.

11. The multilayer inductor component according to claim 1, wherein the metal part has a plurality of crystallites, and an average grain size of the plurality of crystallites is from 0.5 µm to 15.0 µm.

12. The multilayer inductor component according to claim 1, wherein the element body is a sintered body.

13. The multilayer inductor component according to claim 1, further comprising:

a first outer electrode and a second outer electrode that are disposed along an outer surface of the element body and that are electrically connected to a first end and a second end of the coil, respectively, wherein the outer surface includes a mounting surface on which both the first outer electrode and the second outer electrode are disposed, a first end surface on which only the first outer electrode is disposed, and a second end surface on which only the second outer electrode is disposed, and the mounting surface, the first end surface, and the second end surface are orthogonal to the planes along which the coil conductor layers extend.

14. The multilayer inductor component according to claim 3, wherein at least one of the coil conductor layers has a cross section orthogonal to the extension direction in which the proportion of a total area of the internal glass portion to an area of the coil conductor layer is from 1.0% to 20.0%.

15. The multilayer inductor component according to claim 2, wherein the element body includes glass, and when a glass portion in the element body within 10 µm from the perimeter of the coil conductor layer is denoted as a peripheral glass portion and a glass portion in the element body outside the peripheral glass portion is denoted as an outlying glass portion, the softening temperature of the peripheral glass portion is lower than the softening temperature of the outlying glass portion.

16. The multilayer inductor component according to claim 2, wherein the metal part has a plurality of crystallites, and an average grain size of the plurality of crystallites is from 0.5 µm to 15.0 µm.

17. A multilayer inductor component comprising:

an element body that is an insulator; and a coil in which a plurality of coil conductor layers that extend along planes in the element body are electrically connected to each other, wherein each of the coil conductor layers includes a metal part and a glass part, the element body includes glass, and when a glass portion in the element body within 10 µm from the perimeter of the coil conductor layer is denoted as a peripheral glass portion and a glass portion in the element body outside the peripheral glass portion is denoted as an outlying glass portion, the softening temperature of the peripheral glass portion is lower than the softening temperature of the outlying glass portion, and the softening temperature of the peripheral glass portion is lower than or equal to the softening temperature of the glass part.

18. A method for manufacturing the multilayer inductor component according to claim 1, the method comprising:

forming a multilayer body by using an insulating paste containing a glass powder and a conductive paste containing a metal powder and a glass powder such that coil conductor patterns composed of the conductive paste are arranged between a plurality of insulating paste layers composed of the insulating paste in the multilayer body; and firing the multilayer body so as to sinter the metal powder and the glass powder into the metal part and the glass part, respectively, of the coil conductor layers, wherein in the forming a multilayer body, the glass powder contained in the conductive paste has a lower softening temperature than the glass powder contained in the insulating paste, and in the firing of the multilayer body, the glass powder contained in the conductive paste forms an internal glass portion by entirely included into the metal part and sintered, and the glass powder contained in the conductive paste forms a peripheral glass portion by pushed outside the metal part and sintered.

19. A multilayer inductor component comprising:

an element body that is an insulator; and a coil in which a plurality of coil conductor layers that extend along planes in the element body are electrically connected to each other, wherein each of the coil conductor layers includes a metal part and a glass part, the glass part includes an internal glass portion that is entirely included in the metal part, the element body includes glass, and when a glass portion in the element body within 10 µm from the perimeter of the coil conductor layer is denoted as a peripheral glass portion and a glass portion in the element body outside the peripheral glass portion is denoted as an outlying glass portion, the softening temperature of the peripheral glass portion is lower than the softening temperature of the outlying glass portion, and the softening temperature of the peripheral glass portion is lower than or equal to the softening temperature of the internal glass portion.

* * * * *